US012577139B2

(12) United States Patent
Delheur et al.

(10) Patent No.: US 12,577,139 B2
(45) Date of Patent: Mar. 17, 2026

(54) DRYING COMPOSITION TO FACILITATE THE TRANSPORTATION OF SALTY SLUDGE

(71) Applicant: APROTEK, Saint Romain le Puy (FR)

(72) Inventors: Stéphane Delheur, Saint Marcellin en Forez (FR); Christian Chapelle, Andrézieux Bouthéon (FR)

(73) Assignee: APROTEK, Saint Romain le Puy (FR)

( * ) Notice: Subject to any disclaimer, the term of this patent is extended or adjusted under 35 U.S.C. 154(b) by 368 days.

(21) Appl. No.: 18/030,135

(22) PCT Filed: Oct. 1, 2021

(86) PCT No.: PCT/EP2021/077092
§ 371 (c)(1),
(2) Date: Apr. 4, 2023

(87) PCT Pub. No.: WO2022/078776
PCT Pub. Date: Apr. 21, 2022

(65) Prior Publication Data
US 2024/0140850 A1 May 2, 2024

(30) Foreign Application Priority Data
Oct. 14, 2020 (FR) ...................................... 2010508

(51) Int. Cl.
*B01J 20/26* (2006.01)
*B01J 20/28* (2006.01)
*C02F 11/00* (2006.01)
*C02F 11/147* (2019.01)
*C02F 103/00* (2006.01)
C02F 103/34 (2006.01)

(52) U.S. Cl.
CPC ........... *C02F 11/147* (2019.01); *B01J 20/261* (2013.01); *B01J 20/267* (2013.01); *B01J 20/28004* (2013.01); *B01J 20/28016* (2013.01); *C02F 2103/001* (2013.01); *C02F 2103/34* (2013.01)

(58) Field of Classification Search
CPC .............. C02F 11/147; C02F 2103/001; C02F 2103/34; C02F 11/008; B01J 20/261; B01J 20/267; B01J 20/28004; B01J 20/28016; B01J 2220/445; B01J 2220/68
See application file for complete search history.

(56) References Cited

U.S. PATENT DOCUMENTS

| | | | |
|---|---|---|---|
| 1,693,890 A | 12/1928 | Duclaux | |
| 3,661,815 A | 5/1972 | Smith | |
| 3,846,404 A | 11/1974 | Nichols | |
| 3,935,099 A | 1/1976 | Weaver et al. | |
| 4,497,930 A | 2/1985 | Yamasaki et al. | |
| 4,587,308 A | 5/1986 | Makita et al. | |
| 4,833,222 A | 5/1989 | Siddall et al. | |
| 5,180,798 A | 1/1993 | Nakamura et al. | |
| 5,807,916 A | 9/1998 | Collette et al. | |
| 5,976,696 A | 11/1999 | Collette et al. | |
| 2011/0094968 A1 | 4/2011 | Spittle et al. | |

FOREIGN PATENT DOCUMENTS

| | | |
|---|---|---|
| CN | 101643308 | 2/2010 |
| CN | 111423159 | 7/2020 |
| DE | 102012102473 | 9/2013 |
| EP | 0036463 | 9/1981 |
| EP | 0068189 | 1/1983 |
| EP | 0195550 | 9/1986 |
| FR | 2818560 | 6/2002 |
| FR | 2923830 | 5/2009 |
| FR | 3029195 | 6/2016 |
| JP | 08-299999 | 11/1996 |

OTHER PUBLICATIONS

Ondrey, G., "Commercial plant with recover salts from incinerator flyash", ChemEngOnline. Aug. 1, 2020.*
JRM Chemical, Inc., "Soil erosion polymers". Nov. 2006.*

* cited by examiner

*Primary Examiner* — Benjamin L Lebron
(74) *Attorney, Agent, or Firm* — Millen, White, Zelano & Branigan, P.C.; Christopher W. Brody

(57) ABSTRACT

The present invention relates to the technical field of treating urban and industrial saline sludges in general and more specifically the "conditioning" thereof before it is removed through the appropriate channels. The drying composition of the invention makes it possible to easily transport and store saline sludges, namely all sludges comprising even small quantities of salts made up of inorganic anions, in particular chlorides, and cations such as sodium, potassium, calcium and magnesium. Said drying composition is characterized in that it comprises: —at least 50% and up to 99% by weight of a superabsorbent polymer—and from 1% to 99% by weight of a flocculant polymer. It makes it possible to dry saline sludges by significantly reducing the quantity of superabsorbent required to achieve said outcome. The invention also relates to the use of the composition for conditioning saline sludges.

13 Claims, No Drawings

DRYING COMPOSITION TO FACILITATE THE TRANSPORTATION OF SALTY SLUDGE

The present invention relates to the technical field of treating urban and industrial saline sludges in general and more specifically the "conditioning" thereof before it is removed through the appropriate channels. The drying composition of the invention makes it possible to easily transport and store saline sludges, namely all sludges comprising even small quantities of salts made up of inorganic anions, in particular chlorides, and cations such as sodium, potassium, calcium and magnesium. Said drying composition is characterized in that it comprises: —at least 50% and up to 99% by weight of a superabsorbent polymer—and from 1% to 99% by weight of a flocculant polymer. It makes it possible to dry saline sludges by significantly reducing the quantity of superabsorbent required to achieve said outcome. The invention also relates to the use of the composition for conditioning saline sludges.

TECHNICAL FIELD OF THE INVENTION

A large list of industrial activities uses brines and saline waters which produce large quantities of sludges containing salts, such as sodium chloride, sometimes in very high concentrations (5% and more). Those sludges are obtained with a variable dryness limit and are often very liquid or pasty despite the use of mechanical dewatering processes, such as belt filters and centrifuges. Conditioning aimed at preparing the sludge in order to increase its dryness is therefore generally necessary in order to facilitate its handling, transport and storage. Among the different conditionings aimed at preparing the sludge, we can cite, without limitation:

thermal coagulation which consists of cooking the sludges, chemical conditioning: very large quantities of lime, carbonates and various mineral products as well as organic products (sawdust) are used to thicken and above all dry out the sludges. Once treated, the initial weight of the sludges is then greatly increased: for example, to treat 100 m³ of sludge, it is necessary to add between 50 and 100 tons of lime. This increases their volume and therefore their transportation and landfill costs.

The person skilled in the art will understand that the final weight of the sludges and therefore their transportation and disposal channel cost is a major technical problem.

The subject of the invention is a drying composition which makes it possible, at very low dosages, to absorb the liquid part of the saline sludges.

TECHNICAL BACKGROUND

Due to their high salt concentration, saline sludges are generally conditioned, when possible, using energy-intensive and therefore costly physical treatments, by:

Temperature increase.

Thermal conditioning: consisting of subjecting the sludge for a short time (30 to 120 min) to high temperatures under the action of steam.

Freezing/thawing.

Among the additives that have been recommended in an attempt to dry out the sludges, we know the applicant's patent FR3029195 which proposes to greatly improve the effectiveness of the chemical conditioning of the sludge by the joint use of a superabsorbent polymer (SAP) and lime. The addition of superabsorbent in the composition makes it possible in particular to considerably increase the water retention efficiency of the lime.

However, it is well known by those skilled in the art that the more the sodium chloride concentration of the liquid to be absorbed increases, the more the absorption capacity of the SAP decreases, making the implementation of the invention impossible in the case of salty sludge, unless you have to overuse the corresponding additives.

PRESENTATION OF THE INVENTION

The applicant has carried out numerous tests and demonstrated that when a composition based on a superabsorbent polymer and a flocculant polymer is added to a saline sludge in the form of a dry mixture, the drying of the sludge is not only made possible at very low proportions but is also extremely fast.

According to the present invention, it has been found, unexpectedly, that a particularly effective drying composition for conditioning saline sludges can be used when it comprises—at least 50% and up to 99% by weight of powdered superabsorbent polymer—and from 1% to 50% by weight of a flocculant polymer powder.

SUMMARY OF THE INVENTION

The present invention relates to a drying composition in powder form to allow optimum conditioning of saline sludges before their elimination by the appropriate channels. The composition of the invention makes it possible to be able to quickly and easily dry out the salty sludge. This drying composition includes:

at least 50% and up to 99% by weight of a superabsorbent polymer powder, preferably between 70% and 95% by weight, and advantageously between 75% and 90% by weight and from 1% to 50% by weight of a flocculant polymer powder, preferably between 5% and 30% by weight, and advantageously between 10% and 25% by weight The invention also relates to the use of the composition for conditioning saline sludges.

The compositions, according to the invention, added to the saline sludges transform the latter into a transportable and storable sludge and eliminate all the drawbacks of the prior art. In particular, the drying of saline sludge is no longer influenced by its salt content. In addition, the presence of flocculant polymer in the composition quite surprisingly makes it possible to very significantly reduce the quantity of superabsorbent polymer necessary to obtain a shovelable and therefore transportable sludge.

DETAILED DESCRIPTION OF THE INVENTION

An object of the invention is to propose new drying compositions having optimized properties to allow the transport and storage of saline sludges in order to facilitate their extraction. They come in dry form, i.e. a mixture of powders, so that they can be easily transported, stored and set up.

The present invention therefore relates to a new drying composition for saline sludges comprising:

at least 50% and up to 99% by weight of a superabsorbent polymer powder, preferably between 70% and 95% by weight, and advantageously between 75% and 90% by weight and from 1% to 50% by weight of a flocculant polymer powder, preferably between 5% and 30% by weight, and advantageously between 10% and 25% by weight The drying compositions produced according to the invention, which are in the form of a powder, are used at the rate of 2 to 25 kg per ton of salty sludge, preferably 3 to kg per ton of salty sludge.

Salts consist of anions such as carbonates, chlorides, sulfates, fluorides, nitrates and cations such as sodium, potassium, calcium and magnesium. These salts can form strong ionic associations in the soil and subsoil, or are linked with other organic or inorganic compounds in the form of molecular complexes.

The composition of the sludge depends on the nature of the initial water pollution. Sodium chloride is the most rejected or naturally present salt in the natural environment. The main sources of chloride discharges are industrial effluents, rainwater from urbanized areas, domestic wastewater, cleaning of port areas, etc. These discharges have very varied concentrations which can reach 200 g/L and therefore strongly affect the treatment of the liquid waste which contains them.

The present invention relates to the technical sector of the treatment of urban and industrial saline sludges in general, in particular chlorinated sludges, and their "conditioning" before their elimination by the appropriate channels. The drying composition of the invention makes it possible to easily transport and store saline sludges, namely all sludge comprising even small quantities of salts consisting of inorganic anions, in particular chlorides, and cations such as sodium, potassium, calcium and magnesium.

In practice, the superabsorbent polymer used is a water-retaining agent of natural or synthetic origin which has a water retention capacity greater than or equal to 30 times its weight of demineralized water, preferably greater than or equal to 50 times, advantageously greater or equal to 100 times. This type of polymer is generally known by the abbreviation: SAP ("superabsorbent polymer"). It generally comes in the form of powder, agglomerated or not. Their structure based on a three-dimensional network comparable to a multitude of small cavities, each of which has the ability to deform and absorb water, gives them the property of absorbing very large quantities of water and therefore of swelling.

The superabsorbent polymers of natural origin, which can be used in the context of the present invention, are for example those described in U.S. Pat. Nos. 358,364, 1,693, 890, 3,846,404, 3,935,099 or U.S. Pat. No. 3,661,815 . . . . Mention will be made, without limitation, of: guar gum, alginates, carboxymethyl cellulose, dextran, xanthan gum . . . . The SAPs of synthetic origin that can be used in the context of the present invention are, for example, cross-linked water-soluble polymers, or that can be crosslinked. There are many types. Such polymers are for example described in patent FR 2559158 in which there are described crosslinked polymers of acrylic or methacrylic acid, cross-linked graft copolymers of the polysaccharide/acrylic or methacrylic acid type, crosslinked terpolymers of the acrylic or methacrylic acid type/acrylamide/sulfonated acrylamide and their alkaline earth or alkali metal salts.

In a preferred embodiment, the monomers used for the preparation of the superabsorbent polymers are chosen from acrylamide and/or partially or totally salified acrylic acid and/or partially or totally salified ATBS (acrylamido tertio butylsulfonate) and/or NVP (N vinylpyrrolidone) and/or acryloylmorpholine and/or partially or totally salified itaconic acid. In a preferred embodiment, the superabsorbent polymers are anionic crosslinked homopolymers or copolymers based on partially or totally salified acrylic acid.

Other hydrophilic monomers, such as for example cationic monomers, but also monomers with hydrophobic characteristics, could be used to produce the superabsorbent polymers. Among the cationic monomers, we will quote as an example diallyldialkyl ammonium salts and monomers of the dialkylaminoalkyl (meth)acrylate, dialkylaminoalkyl (meth)acrylamide type as well as their quaternary ammonium or acid salts. Mention will be made in particular of quaternized or salified dimethylaminoethyl acrylate (ADAME) and/or dimethylaminoethyl methacrylate (MA-DAME), acrylamidopropyltrimethylammonium chloride (APTAC) and/or methacrylamidopropyltrimethylammonium chloride (MAPTAC).

Synthetic superabsorbent polymers are generally cross-linked with 100 to 6000 ppm of at least one crosslinking agent chosen from the group comprising acrylic compounds such as for example methylene bis acrylamide, allylic compounds such as for example tertra allylammonium chloride, vinyl compounds such as for example divinyl benzene, diepoxy, metal salts . . . . Some can also have a double crosslinking such as, for example, an acrylic crosslinker.

Preference will be given, for cost reasons, to superabsorbent polymers of synthetic origin of crosslinked sodium polyacrylate type.

The SAP can be obtained by all the polymerization techniques well known to those skilled in the art: gel polymerization, precipitation polymerization, emulsion polymerization (aqueous or inverse) followed or not by a distillation step, suspension polymerization, polymerization in solution, these polymerizations being optionally followed by a step allowing to isolate a dry form of the (co)polymer by all types of means well known to those skilled in the art.

According to the invention, the superabsorbent polymer may be post-crosslinked at the surface, namely that they:

result from the polymerization with partial crosslinking of water-soluble ethylenically unsaturated monomers containing at least one carboxylic function, in particular acrylic and methacrylic acids and their alkaline salts, whether obtained by a polymerization process in solution, in bulk or in suspension inverse, as described for example in patent applications EP312952, EP441507 or EP742231 . . . .

And have crosslinking outside the polymer grains. This surface crosslinking is called post-crosslinking because it takes place on the SAP powder when the polymerization is complete and the SAP partially dehydrated, during drying. Post-crosslinking makes it possible to form a highly crosslinked shell around the SAP particles. The SAP particles then have a "core-shell" structure.

The post-crosslinking steps of hydrophilic polymers having carboxylic and/or carboxylate groups by a polyfunctional agent are well known to those skilled in the art. The dry powder is typically post-cured by reacting it with other cross-linking agents such as, for example, organic cross-linking agents and/or multivalent cations, to produce a more highly cross-linked surface layer compared to the inside the particles. The methods commonly used for surface post-crosslinking include a step consisting in bringing the base polymer into contact with a surface post-crosslinking agent followed by a subsequent heat treatment step. The latter is intended to complete the post-crosslinking on the surface, the heat treatment being generally carried out hot, generally using continuous "dryers". Examples include documents GB 2126591, EP789048, FR2923830, etc. There are many molecules described in the literature capable of reacting sufficiently quickly on the carboxylic groups of SAPs, in order to carry out the bridging of the polymer chains. A well-known way is to post-treat its "base" superabsorbent polymer. To do this, the dried powder of so-called "base" superabsorbent polymer is subjected to additional crosslinking on a surface layer of its particles, by a surface post-crosslinking step. Surface post-crosslinking increases the crosslink density at the surface of the shell of the superabsorbent polymer particles thereby reducing the absorptive capacity of the superabsorbent polymer in the surface layer.

The invention will advantageously be implemented with superabsorbent polymer particles of spherical or non-spherical shape and whose mean diameter is generally between 5 $\mu$m and 5000 $\mu$m and preferably between 100 and 250 $\mu$m. This water-retaining polymer (or the mixture of water-retaining polymers) represents from 50% to 99% by weight of the latter, preferably from 70% to 95% by weight and advantageously more than 75% and less than 90% by weight of the drying composition according to the invention. Advantageously, the SAP will have a particle size similar to that of the flocculant polymer powder also present in the composition.

In practice, the flocculant polymer constituting one of the 2 essential elements in the composition according to the invention is a water-soluble anionic or nonionic (co)polymer of high molecular weight soluble in water, in the form of a powder, and whose molecular weight is greater than $10^5$ g/mol and preferably greater than $10^6$ g/mol. The high molecular weight water-soluble polymer was obtained by polymerization of at least one monomer chosen from:

nonionic monomers: water-soluble vinyl monomers. Preferred monomers belonging to this class include acrylamide and methacrylamide, acrylamide derivatives such as N-alkylacrylamides, for example N-isopropylacrylamide, N-tert-butylacrylamide, octylacrylamide as well as N,N-dialkylacrylamides such as N-N-dimethylacrylamide and N-methylolacrylamide. Also can be used vinylformamide, N-vinylpyridine, N-vinylpyrrolidone, hydroxyalkyl acrylates and methacrylates. A preferred nonionic vinyl monomer will be acrylamide.

and/or anionic monomers having acrylic, vinyl, maleic, fumaric, allylic functionalities and containing a carboxy, phosphonate, sulfonate group, or another group with an anionic charge, or else the ammonium or alkaline earth metal salt or corresponding alkali metal of such a monomer. Among these are acrylic acid, methacrylic acid, acrylamidomethylpropanesulfonic acid, acrylamidomethylbutanoic acid, maleic acid, fumaric acid, itaconic acid, vinylsulfonic acid, styrene acid sulfonic acid, vinylphosphonic acid, allylsulfonic acid, allyiphosphonic acid and their water-soluble alkali metal, alkali earth metal, and ammonium salts.

The invention will advantageously be implemented with flocculant polymer particles of spherical or non-spherical shape and whose mean diameter is generally between 5 $\mu$m and 5000 $\mu$m and preferably between 100 and 250 $\mu$m. The flocculant polymer (or the mixture of flocculant polymers) represents from 1% to 50% by weight of the latter, preferably from 5% to 30% by weight and advantageously more than 10% and less than 25% by weight of the composition drying agent according to the invention. Advantageously, the flocculant polymer will have a particle size similar to that of the superabsorbent polymer powder also present in the composition.

The superabsorbent polymer and the flocculant polymer are in the form of a homogeneous mixture and are therefore introduced simultaneously. This is a real "composition".

The addition of the composition of the invention is carried out directly in the saline sludge by mechanical mixing (mixing screw, mechanical shovel, etc.) and makes it possible to obtain an optimized drying and agglomerating effect. The composition has been observed to produce much better combined effects than adding the components separately. The drying composition of the invention has the property of dramatically increasing the retention capacities for saline liquids, in particular chlorides. This result was totally unexpected insofar as the presence of salt leads in most cases to the inactivation of SAPs by limiting its swelling capacity so that the person skilled in the art was therefore not encouraged to use this type of polymer to solve the present problem. The presence of an anionic or non-ionic flocculant polymer seems, without this being able to be explained, to have a beneficial effect on the superabsorbent polymer by limiting its sensitivity to salt. There is therefore a real and unexpected synergy of the two ingredients of the composition.

The present invention also relates to any variant or adaptation which will appear clearly to those skilled in the art, if necessary by having recourse to a few routine tests.

EXAMPLES

Comparative tests were carried out using the following compounds:

superabsorbent polymers (SAP): as described in Table 1 below flocculant polymer (PF): brand "APROFLOC" PA03: high molecular weight anionic water-soluble polymer (5.106 g/mol) copolymer of sodium acrylate (30%) and acrylamide (70%)

TABLE 1

| Product reference | Type of super absorbent polymer | Trade name | Anionicity | SAP average Particle Sizes |
|---|---|---|---|---|
| P150 | Cross-linked sodium polyacrylate | Brand "Apromud" P150 | 100% Anionic | <150 $\mu$m |
| G300 | Cross-linked and post-cross-linked sodium polyacrylate | Brand "Apromud" G300 | 100% Anionic | 500-850 $\mu$m |

Drying tests (solidification/stabilization) were carried out on a type of biological sludge from a wastewater treatment plant (15% dry matter) to which the applicant added different quantities of sodium chloride expressed in mass concentrations (see table 2).

TABLE 2

| Reference of salt sludge tested | Quantities of sodium chloride expressed in mass concentrations (Weight %) |
|---|---|
| B1 | 3% |
| B2 | 5% |

For the realization of the examples presented in table 3, the mixtures of the drying agents with the salty mud were carried out mechanically until visual homogenization.

7

TABLE 3

| Sludge type | Composition of the drying agent (SAP and PF) expressed in weight % | Dosage of the drying agent expressed in kg per ton of sludge | Drying of the sludge sufficient to make it shovelable (YES or NO) |
|---|---|---|---|
| Counter-example 1 | B1 | P150 (100%) | 10 kg/ton | NO |
| Counter-example 2 | B1 | G300 (100%) | 10 kg/ton | NO |
| Counter-example 3 | B2 | P150 (100%) | 10 kg/ton | NO |
| Counter-example 4 | B2 | G300 (100%) | 10 kg/ton | NO |
| Counter-example 5 | B2 | G300 (100%) | >30 kg/ton | YES |
| Example 1 | B1 | P150 (95%)/PF (5%) | 10 kg/ton | YES |
| Example 2 | B2 | P150 (88%)/PF (12%) | 10 kg/ton | YES |
| Example 3 | B1 | P150 (80%)/PF (20%) | 10 kg/ton | YES |
| Example 4 | B2 | G300 (95%)/PF (5%) | 10 kg/ton | YES |
| Example 5 | B1 | G300 (88%)/PF (12%) | 10 kg/ton | YES |
| Example 6 | B2 | G300 (80%)/PF (20%) | 10 kg/ton | YES |
| Counter-example 6 Sequential addition | B2 | P150 (88%) added first then PF (12%) added second | 8.8 kg/ton of P150 then 1.2 kg/ton of PF | NO |
| Counter-example 7 Sequential addition | B2 | PF (12%) added first then P150 (88%) added second | 1.2 kg/ton of PF then 8.8 kg/ton of P150 | NO |

As can be seen in Table 3, compared to an addition of superabsorbent alone, regardless of the superabsorbent polymer used, the compositions according to the invention allow the drying of saline sludges by drastically reducing the amount of superabsorbent necessary to get the same result. The examples more clearly indicate that when the ingredients of the composition according to the invention are not added in the form of a dry mixture but in a sequential manner, the drying of the sludge is no longer made possible at the same dosages. It seems that there is, unexpectedly, a synergistic effect which occurs when the SAP and the flocculant polymer are added as a mixture in the presence of salts. We were also able to visually observe that this drying out was also extremely rapid. The drying compositions of the invention are both simple (only one mixing point to be used) and quick to implement, and effective. In such way, they perfectly meet the needs of the industry to facilitate the transportation and storage of saline sludges, namely all sludge containing even small quantities of salts consisting of inorganic anions, in particular chlorides, and cations such as sodium, potassium, calcium and magnesium.

The invention claimed is:

1. Method for conditioning saline sludges from industrial effluents, rainwaters from urbanized areas, domestic wastewaters or cleaning out of port areas, characterized in that a drying composition is added to said saline sludges, said drying composition comprising a mixture consisting of:

at least 50% and up to 99% by weight of a superabsorbent polymer powder, characterized in that said superabsorbent polymer is a crosslinked synthetic homopolymer or copolymer comprising partially or totally salified acrylic acid, of the crosslinked sodium polyacrylate type, having a water retention capacity greater than or equal to 30 times its weight in demineralized water, and from 1% to 50% by weight of a flocculant polymer powder, characterized in that the flocculant polymer is an anionic or non-ionic water-soluble (co) polymer of high molecular weight greater than $10^5$ g/mol.

2. The method for conditioning saline sludges according to claim 1, wherein the said powders of superabsorbent polymer and of flocculant polymer have a particle size of between 5 μm and 5000 μm.

3. The method for conditioning saline sludges according to claim 1, wherein said drying composition is added at a rate of 2 to 25 kg per ton of saline sludge from industrial effluents, rainwater from urbanized areas, domestic wastewaters or cleaning out of port areas.

4. The method for conditioning saline sludges according to claim 1, wherein the said powders of superabsorbent polymer and of flocculant polymer have a particle size of between 5 μm and 5000 μm and said drying composition is added at a rate of 2 to 25 kg per ton of saline sludge from industrial effluents, rainwater from urbanized areas, domestic wastewaters or cleaning out of port areas.

5. The method for conditioning saline sludges according to claim 1, wherein said drying composition is added to the saline sludges with mechanical mixing.

6. The method for conditioning saline sludges according to claim 1, wherein said drying composition comprises between 70% and 95% by weight of said superabsorbent polymer powder.

7. The method for conditioning saline sludges according to claim 1, wherein said drying composition comprises between 75% and 90% by weight of said superabsorbent polymer powder.

8. The method for conditioning saline sludges according to claim 1, wherein said superabsorbent polymer has a water retention capacity greater than or equal to 50 times its weight in demineralized water.

9. The method for conditioning saline sludges according to claim 1, wherein said drying composition comprises from 5% to 30% by weight of said flocculant polymer powder.

10. The method for conditioning saline sludges according to claim 1, wherein said drying composition comprises between 10% and 25% by weight of said flocculant polymer powder.

11. The method for conditioning saline sludges according to claim 1, wherein said flocculant polymer has a molecular weight greater than 106 g/mol.

12. The method for conditioning saline sludges according to claim 2, wherein said powders of superabsorbent polymer and of flocculant polymer have a particle size of between 100 and 250 μm.

13. The method for conditioning saline sludges according to claim 4, wherein said powders of superabsorbent polymer and of flocculant polymer have a particle size of between 100 and 250 μm.

* * * * *